United States Patent
Patino et al.

(10) Patent No.: US 7,068,013 B2
(45) Date of Patent: Jun. 27, 2006

(54) BATTERY CIRCUIT WITH NON-VOLITABLE MEMORY AND THERMISTOR ON A SINGLE LINE

(75) Inventors: Joseph Patino, Pembroke Pines, FL (US); Craig G. Bishop, Boca Raton, FL (US); Andrew F. Burton, Coral Springs, FL (US); Russell L. Simpson, Miami, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/783,922

(22) Filed: Feb. 20, 2004

(65) Prior Publication Data

US 2005/0184704 A1    Aug. 25, 2005

(51) Int. Cl.
H02J 7/06    (2006.01)
(52) U.S. Cl. .................. 320/150; 320/152
(58) Field of Classification Search ............ 320/112, 320/106, 150, 134, 137, 136, 153, 154
See application file for complete search history.

(56) References Cited

U.S. PATENT DOCUMENTS

| | | |
|---|---|---|
| 5,371,453 A | 12/1994 | Fernandez |
| 5,506,490 A * | 4/1996 | DeMuro ............ 320/106 |
| 5,534,765 A | 7/1996 | Kreisinger et al. |
| 5,710,505 A * | 1/1998 | Patino ............ 320/134 |

OTHER PUBLICATIONS

U.S. Appl. No. 10/638,621, filed Aug. 11, 2003, Patino et al.
U.S. Appl. No. 10/459,271, filed Jun. 11, 2003, Patino.
U.S. Appl. No. 10/247,160, filed Sep. 18, 2002, Geren et al.

* cited by examiner

Primary Examiner—Karl Easthom
Assistant Examiner—Robert Grant

(57) ABSTRACT

A system (200) includes a battery charger (278) and a battery (202). The battery (202) includes a thermistor (230), a voltage identifying element (240), a switch (244), a memory device (232), and a battery data contact (228), connected to a data port of the memory device (232) and the voltage identifying element (240). The voltage identifying element (240) determines a voltage that controls the switch (244). When the switch (244) is enabled, the thermistor (230), connected to a battery clock contact (224), is active and a microprocessor (102) on the battery charger (278) reads the value of the thermistor (230) via an analog-to-digital converter. When the switch (244) is disabled, the thermistor (230) is switched out and the battery clock contact (224) is used to clock the memory device (232). The battery charger (278) has a data contact (226) for receiving the battery data contact (228) and a clock contact (222) for receiving the battery clock contact (224). The battery charger (278) further includes at least two switches (204,206), and the microprocessor (102) is programmed to selectively operate the switches (204,206).

12 Claims, 2 Drawing Sheets

BATTERY CIRCUIT WITH NON-VOLITABLE MEMORY AND THERMISTOR ON A SINGLE LINE

BACKGROUND OF THE INVENTION

1. Field of the Invention

This invention relates in general to battery charging systems and more particularly, to battery charging systems that identify battery information.

2. Description of the Related Art

Many rechargeable batteries, such as those commonly found in cellular telephones, include a memory device in addition to the battery cells, such as an erasable programmable read-only memory (EPROM) or an electrically erasable programmable read-only memory (EEPROM). The memory device stores important information about the battery in which it is embedded. For example, the memory device can include information about the battery such as the battery type used (example: whether the battery is a nickel-cadmium battery or a lithium battery), and specifics concerning the charging regime to be employed. Moreover, the memory device can store "fuel gauge" information, which can enable the host device (the device to which the battery supplies power) or charger to determine accurately the state of charge of the battery such as a measurement based on measured battery voltage.

In addition to a memory device, many rechargeable batteries contain a thermistor. Incorporating a thermistor into a rechargeable battery permits a microprocessor in the battery charger to monitor the temperature of the battery during the charging process.

The life of these "smart" batteries is therefore extended by insuring that the battery cells are not overcharged, which could permanently damage them. However, batteries that contain a memory device and a thermistor typically include separate contacts for each of these components. The use of "smart" batteries although useful is not without its shortcomings. One shortcoming is the typical "smart" battery configuration increases the number of contacts that the battery, the host device and the charger requires for proper operation. An increased number of contacts in turn adds to the expense and the physical dimensions of the battery as well as the host device and the battery charger.

Accordingly, a need exists for a "smart" battery circuit with a non-volatile memory device and thermistor which reduces the number of contacts required.

SUMMARY OF THE INVENTION

The present invention concerns a battery charging system. The battery charging system includes a battery charger and a battery. The battery includes a thermistor, a voltage identifying element, a switch, a memory device, and a battery data contact, which is connected to a data port of the memory device and the voltage identifying element. The voltage identifying element determines a voltage on the data port and, in turn, controls the switch. When the switch is enabled, the thermistor, which is connected to a battery clock contact, is active and a microprocessor on the battery charger reads the value of the thermistor via an analog-to-digital converter. When the switch is disabled, the thermistor is switched out and the battery clock contact is used to clock the memory device.

The battery charger has a data contact for receiving the battery data contact and a clock contact for receiving the battery clock contact. In another embodiment, the battery charger further includes at least two switches and the microprocessor can be programmed to selectively operate the switches. By enabling a first switch, a first voltage is placed on the data port, enabling the thermistor. When the second switch is active, a second voltage is placed on the data port, disabling the thermistor and providing a clock signal to the memory device.

Erasable Programmable Read Only Memory (EPROM) or an Electrically Programmable Read Only Memory (EEPROM) have been shown to be used advantageously with the present invention. Further a zener diode, a resistor network, a comparator or combination thereof have been shown to be used advantageously as a voltage identifying element.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF THE PREFERRED EMBODIMENT

Figure 1:
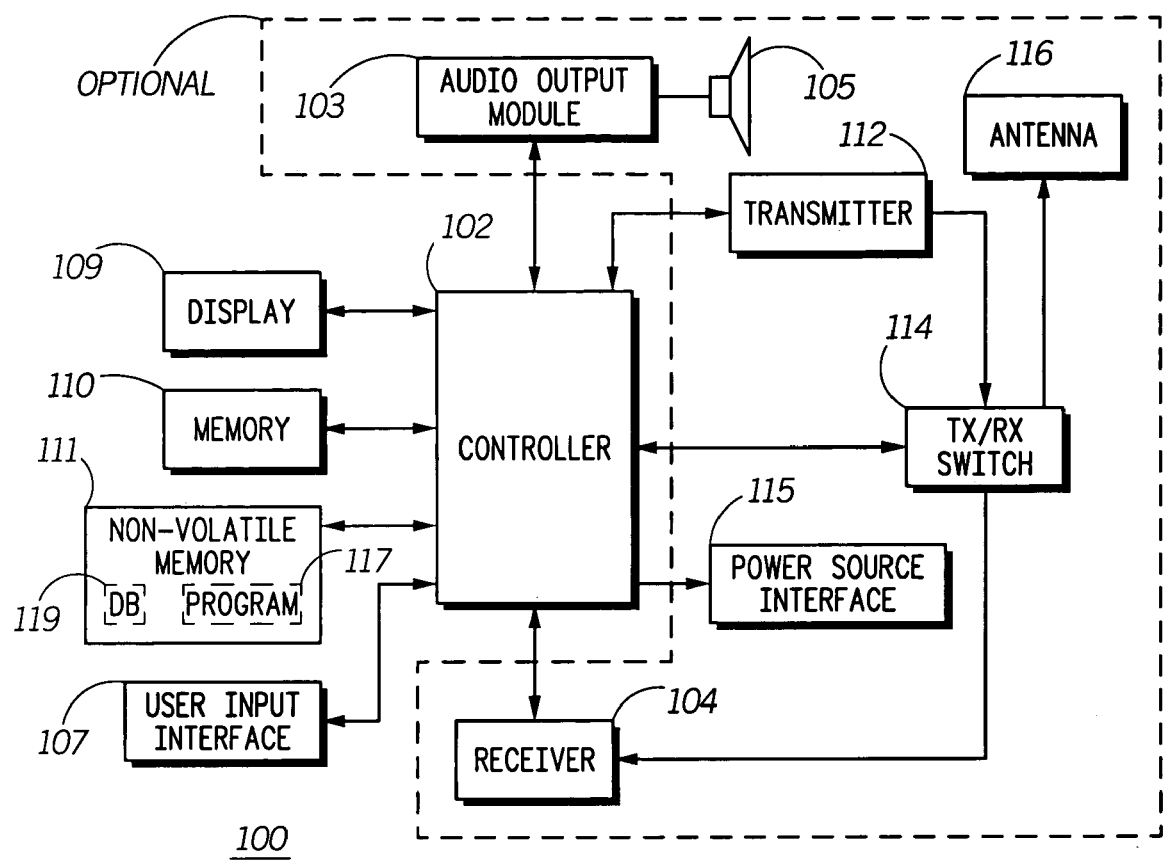
FIG. 1 is a block diagram illustrating an electronic device which incorporates a battery charging system using EEPROM and thermistor multiplexing, according to a preferred embodiment of the present invention.

While the specification concludes with claims defining the features of the invention that are regarded as novel, it is believed that the invention will be better understood from a consideration of the following description in conjunction with the drawing figures, in which like reference numerals are carried forward.

One method to avoid increasing the number of battery contacts with custom memory ICs has been taught in U.S. patent application Ser. No. 10/247,160, entitled "Battery Circuit with Three-Terminal Memory Device", filed on Sep. 18, 2002 and commonly assigned herewith to Motorola, the entire teachings of which are hereby incorporated by reference in its entirety.

Exemplary Embodiment of an Electronic Device

Described now is an exemplary hardware platform according to an exemplary embodiment of the present invention. Referring to FIG. 1, the electronic device 100 is any device 100 with a display including a wireless telephone, radio, PDA, computer, electronic organizer, and other messaging device, and an electronic timepiece. Please note that the terms "electronic device 100", "phone", "radio", "host device" and "wireless device" may be used interchangeably throughout this document in reference to an exemplary electronic device. The electronic device 100 includes a controller 102, a memory 110, a non-volatile (program) memory 111 containing at least one application program 117, and a power control system 120, which includes a power source interface 115 for providing power to the device from a power source such as a battery (not shown) and a battery charger 278 (to be discussed in more detail later) for intelligently charging the battery.

The electronic device 100, in this example is a wireless communication device. The wireless communication device transmits and receives signals for enabling a wireless communication such as for a cellular telephone, in a manner well known to those of ordinary skill in the art. For example, when the wireless communication device 100 is in a "receive" mode, the controller 102 controls a radio frequency (RF) transmit/receive switch 114 that couples an RF signal from an antenna 116 through the RF transmit/receive (TX/RX) switch 114 to an RF receiver 104, in a manner well known to those of ordinary skill in the art. The RF receiver 104 receives, converts, and demodulates the RF signal, and then provides a baseband signal, for example, to audio output module 103 and a transducer 105, such as speaker, in the device 100 to provide received audio to a user. The receive operational sequence is under control of the controller 102, in a manner well known to those of ordinary skill in the art.

In a "transmit" mode, the controller 102, for example responding to a detection of a user input (such as a user pressing a button or switch on a user interface 107 of the device 100), controls the audio circuits and a microphone interface (not shown), and the RF transmit/receive switch 114 to couple audio signals received from a microphone to transmitter circuits 112 and thereby the audio signals are modulated onto an RF signal and coupled to the antenna 116 through the RF TX/RX switch 114 to transmit a modulated RF signal into a wireless communication system (not shown). This transmit operation enables the user of the device 100 to transmit, for example, audio communication into the wireless communication system in a manner well known to those of ordinary skill in the art. The controller 102 operates the RF transmitter 112, RF receiver 104, the RF TX/RX switch 114, and the associated audio circuits (not shown), according to instructions stored in the program memory 111. Further, the controller 102 is communicatively coupled to a user input interface 107 (such as a key board, buttons, switches, and the like) for receiving user input from a user of the device 100. It is important to note that the user input interface 107 in one embodiment is incorporated into the display 109 as "GUI (Graphical User Interface) Buttons" as known in the art. The user input interface 107 couples data signals (to the controller 102) based on the keys depressed by the user. The controller 102 is responsive to the data signals thereby causing functions and features under control of the controller 102 to operate in the device 100. The controller 102 is also communicatively coupled to a display 109 (such as a liquid crystal display) for displaying information to the user of the device 100.

The present invention has been shown to be used advantageously with co-pending U.S. patent application Ser. No. 10/638,621 filed on Aug. 11, 2003, entitled "System And Method For Battery Verification", and U.S. patent application Ser. No. 10/459,271 filed on Jun. 11, 2003, entitled "Battery Charging System", both commonly assigned herewith to Motorola, and the entire teachings of both are hereby incorporated by reference in its entirety.

Figure 2:
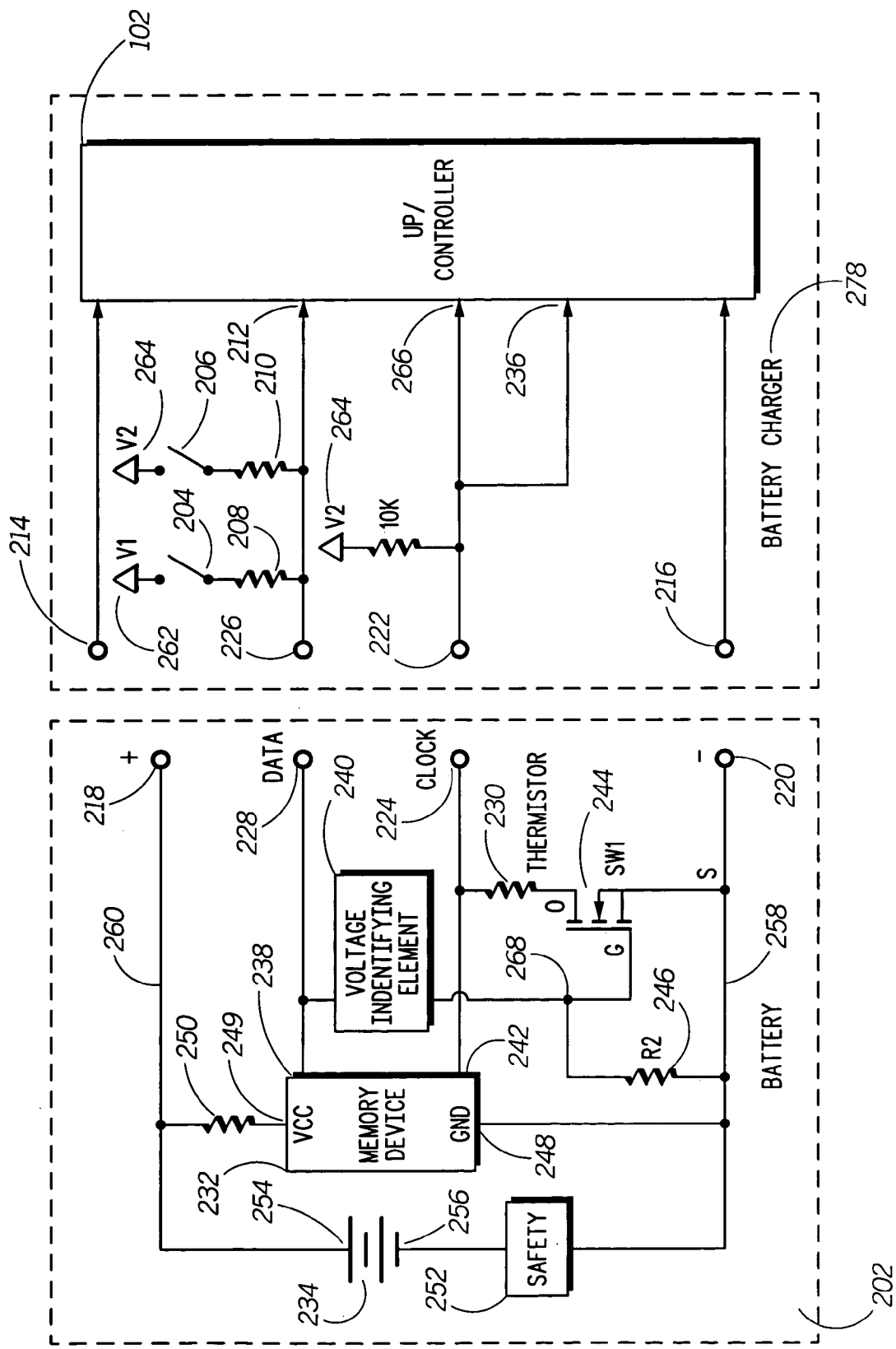
FIG. 2 is a schematic circuit diagram of the battery charging system of FIG. 1, according to a preferred embodiment of the present invention.

Referring to FIG. 2, a battery charging system 200 is illustrated. The battery charging system 200 includes a battery charger 278 and a battery 202. In a preferred embodiment, the battery charger 278 is embedded within an electronic device 100. Alternatively, the battery charger 278 is part of a stand-alone device. For example, a stand-alone charger can be a charger that receives power from a power supply and converts the power to a suitable level for charging a battery; typically, a stand-alone charger performs no other significant function. In contrast, the electronic device 100 is any component that cannot only charge a battery but also performs other important functions. Suitable examples of a host device include a computer, a wireless telephone, or a radio. As the electronic device 100 in the preferred embodiment is a phone, the host device will be hereafter referred to as a "phone".

In one embodiment, the battery charger 278 detachably engages the battery 202 for purposes of charging the battery 202 and/or powering the electronic device 100. Specifically, the battery charger 278 includes a positive phone charging contact 214, adapted to be coupled with a positive battery contact 218. The battery charger 278 also includes a negative phone charging contact 216, adapted to be coupled with a negative battery contact 220. The phone 100 may be powered directly from the positive battery contact 218 and the negative battery contact 220. In an alternative embodiment, the battery 202 includes a separate set of battery contacts (not shown) for providing power to the phone 100. As discussed in detail below, the battery charger 278 includes a battery charger data contact 226 for receiving a battery data contact 228, into which a data port 238 of a memory device 232 and a voltage identifying element 240 terminates. The battery charger 278 includes a battery charger clock contact 222 adapted for receiving a battery clock contact 224, into which a clock port 242 of the memory device 232 and a thermistor 230 terminates.

The battery 202 includes one or more cells 234, which discharge to provide power to the host device 100. The battery charger 278 recharges the cells 234 when the cells 234 become depleted. Further, the cells 234 include a positive terminal 254 coupled to the positive battery contact 218 for providing the positive voltage B+ to the host device through the positive battery node 260. In addition, the cells 234 includes a negative terminal 256, coupled to a safety circuit 252 which prevents over-charging or under-charging the cells 234. In one embodiment, the safety circuit 252 may be coupled to the negative battery contact 220, and in turn, provide a negative voltage (B−) or ground point to the battery charger 278 through the negative battery node 258.

The battery charger 278 includes a microprocessor or microcontroller 102 and a pair of switches 204, 206, which will determine the function of the battery charger clock contact 222. The battery charger data contact 226 is coupled to an input/output (I/O) port 212 on the microprocessor 102, as well as coupled to switch 204 and switch 206 through a pair of pull-up resistors 208, 210. Switch 204, when closed, pulls up the voltage on port 212 to the voltage level set by a first voltage source 262 having a voltage level noted as V1 (5.5V in a preferred embodiment), through resistor 208. Switch 206, when closed, pulls up the voltage on port 212 to the voltage level set by a second voltage source 264, having a voltage level noted as V2 (2.775V in a preferred embodiment), through resistor 210. Only one of switch 204 and switch 206 may be closed at any given time. The battery charger clock contact 222 is coupled to the microprocessor 102 through an I/O port 266. Additionally, the battery charger clock contact 222 may also be coupled to the microprocessor 102 through an analog-to-digital (A/D) converter 236.

As noted earlier, the battery 202 includes a thermistor 230, a voltage identifying element 240 and a memory device 232. The voltage identifying element 240 and the thermistor 230 may be coupled by a switch 244. The switch 244 may be a transistor device, such as a FET, with the drain coupled to the thermistor 230, the source coupled to the negative battery node 258, and the gate coupled to the voltage identifying element 240 and a resistor 246 at node 268.

The battery charger functions as follows. To read or write to the memory device 232, switch 206 would be closed and switch 204 opened, placing V2 (2.775V) onto the battery charger data contact 226. The voltage identifying element 240 uses the voltage at the battery data contact 228 ("data line") to set a control voltage at node 268. The voltage identifying element 240 may include a zener diode, a resistor divider network, a comparator, or any other voltage identifying device commonly known to those skilled in the art. When the voltage level is low enough or high enough not to enable switch 244, the thermistor 230 is switched off at the battery clock contact 224 ("clock line"). In this mode, the host device 100 communicates with the memory device 232 via I/O ports 212 and 266 as normal.

Although the use of the clock line 224 in this embodiment is used to read the value of the thermistor 230. In another embodiment (not shown), the roles of the data and clock lines are reversed, where a voltage is placed on the data line 228 and the value of the thermistor 230 is read from the data line as is understood by those of average skill in the arts.

To read the thermistor 230 value switch 204 would be closed and switch 206 would be opened, placing V1 (5.5V) onto the data line 228. The voltage identifying element 240 then enables the voltage at node 268 high enough or low enough to allow switch 244 to conduct. In this mode, the thermistor 230 is switched onto the clock line 224, allowing the microprocessor 102 to the thermistor 230 value via an analog-to-digital converter 236 as normally read. In this fashion, the radio or electronic device 100 selectively reads or writes to the memory device 232 or read the thermistor 230 without any interaction between the memory device 232 and the thermistor 230. It is important to note that although switch 244 is shown as a PNP transistor, to those of average skill in the art, NPN transistors types could be substituted as well within the true scope and spirit of the invention.

In this arrangement, the power node 249 of the memory device 232 is biased directly from the positive battery node 260 through resistor 250. The ground node 248 of the memory device is coupled directly to the negative battery node 248. It will be obvious to those of ordinary skill in the art that this configuration means that the memory device 232 is continuously drawing current from the battery cells 234. However, since the standby current of a typical EPROM or EEPROM is in the single digit microamp range, this current drain should be fairly insignificant.

In one arrangement, the battery charger 278 selectively reads the memory device 232 or a value of the thermistor 230. For example, this value can be the impedance of the thermistor 230, which the microprocessor 102 of the battery charger 278 is used to monitor the temperature of the battery 202 as it is being charged.

As another example, the memory device 232 is an EPROM that stores information about the battery 202, such as the battery type, the charging scheme to be employed and the status of the charge of the battery 202. The microprocessor 102 of the battery charger 278 reads the memory device 232 and uses this information for purposes of ensuring that the battery 202 is efficiently and properly charged.

Of course, it is understood that the memory device 232 is not limited to being an EPROM, as the memory device is any other suitable component capable of storing information, such as an EEPROM, non-volatile RAM, and FLASH memory. Moreover, the memory device 232 is in no way limited to merely storing information about the status of the battery 202, as the memory device 232 stores any other suitable type of data. The actual functionality of the battery 202 is increased by replacing the EPROM on used in present battery designs with an EEPROM which increases the overall functionality of the battery 202 by allowing battery information such as, but not limited to, charge cycles, date of last charge, power supply used, maximum charge current, maximum charge voltage, and temperature to be written to the EEPROM. This information is used to help determine the root cause of return issues and possible safety issues, therefore reducing development and warranty costs. Furthermore, by allowing the single sourced custom EPROM used in most present designs to be replaced by a lower cost, standard off-the-shelf EEPROM, the present invention reduces the overall cost of the battery 202.

Additionally, by using the data line 228 to selectively switch in the thermistor 230 on the clock line 224, the radio 100 is able to:

1) read the battery temperature, and
2) read/write the EEPROM without adding an additional contact to achieve this capacity.

This allows the standard four battery contact configuration to be maintained.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A battery system comprising:
    a battery;
    a thermistor, with a first end and a second end;
    a memory device;
    a plurality of contacts adapted to be communicatively coupled with a battery charger including
        a battery data contact,
        a battery clock contact; and
    wherein the battery charger selectively performs at least one of clocking the memory device and reading a value of the thermistor, through one of the battery charger clock contact and the battery data contact;
    wherein the memory device comprises a data port communicatively coupled to the battery data contact and a first end of a voltage identifying element, and a clock port communicatively coupled to the battery clock contact and the first end of the thermistor; and
    wherein the voltage identifying element includes a second end, the first end of the voltage identifying element being communicatively coupled to the battery data contact, for identifying a voltage at the battery data contact, and a switch, communicatively coupled between the second end of the thermistor and the second end of the voltage identifying element, for selectively reading a value of the thermistor and outputting a clock signal to a memory device clock port.

2. The system according to claim 1, wherein the memory device is one of an erasable programmable read only memory (EPROM), an electrically erasable programmable read only memory (EEPROM), a non-volatile random access memory (RAM) and a FLASH memory.

3. The system according to claim 1, wherein the battery charger is one of a stand-alone charger and a host device.

4. The system according to claim 3, wherein the voltage identifying element is one or a zener diode, a resistor divider network, and a comparator.

5. A battery charging system comprising:
    a battery charger;
    a battery;

a thermistor, with a first end and a second end;
a memory device;
a plurality of contacts adapted to be communicatively coupled with the battery charger including
  a battery data contact,
  a battery clock contact; and
  a memory device;
wherein the battery charger selectively performs at least one of clocking the memory device and reading a value of the thermistor, through one of the battery charger clock contact and the battery data contact
wherein the memory device comprises a data port communicatively coupled to the battery data contact and a first end of a voltage identifying element, and a clock port communicatively coupled to the battery clock contact and the first end of the thermistor; and
wherein the voltage identifying element includes a second end, the first end of the voltage identifying element being communicatively coupled to the battery data contact, for identifying a voltage at the battery data contact, and a switch, communicatively coupled between the second end of the thermistor and the second end of the voltage identifying element, for selectively reading a value of the thermistor and outputting a clock signal to a memory device clock port.

6. The system according to claim 5, wherein the memory device is one of an erasable programmable read only memory (EPROM), an electrically erasable programmable read only memory (EE.PROM), a non-volatile random access memory (RAM) and a FLASH memory.

7. The system according to claim 5, wherein the voltage identifying element is one of a zener diode, a resistor divider network, and a comparator.

8. The system according to claim 5, wherein the battery charger comprises a microprocessor, a first switch, and a second switch, for selectively placing a voltage on the battery data contact.

9. The system according to claim 8, wherein the microprocessor is programmed to selectively operate the first switch and the second switch.

10. The system according to claim 9, wherein the microprocessor reads a value of the thermistor coupled to the battery clock contact in response to closing the first switch.

11. The system according to claim 9, wherein the microprocessor generates a clock signal on a node coupled to the clock contact in response to closing the second switch.

12. The system according to claim 8, wherein said microprocessor comprises an analog-to-digital converter and an output, the analog-to-digital convener and the output both coupled to the clock contact.

* * * * *